Patented Sept. 17, 1946

2,407,766

UNITED STATES PATENT OFFICE 2,407,766

MODIFIED ALKYD RESINS

John Harold Perrine, Prospect Park, and Herbert L. Johnson, Norwood, Pa., assignors to Sun Oil Company, Philadelphia, Pa., a corporation of New Jersey No Drawing. Application September 3, 1943, Serial No. 501,140

6 Claims. (Cl. 260—76)

This invention relates to resins and compositions containing the same and especially to resins of the alkyd type comprising reaction products of polybasic acids or anhydrides thereof with polyhydric alcohols. More particularly, the invention is directed to alkyd resins containing as an essential ingredient certain acidic products resulting from partial oxidation of petroleum hydrocarbons.

Alkyd resins, typified by those formed through the reaction of glycerol with phthalic anhydride in the presence of modifying agents, have entered into widespread use in lacquers and other coating compositions, in the impregnation of fabrics, wood and paper, in bonding and adhesive compositions, in modification of other resins, and in many other fields.

The resins made from glycerol and phthalic anhydride alone are generally inapplicable and must be modified by the presence of other ingredients known as modifiers. It heretofore has been suggested that various acids derived from petroleum, for instance naphthenic acids, be employed as modifiers in alkyd resins. Such materials are beneficial in imparting desired properties to the product, but in order to yield a product satisfactory for most purposes, it is necessary to use a relatively large amount of glycerol. For instance, when naphthenic acids are used as the modifying agent, 50–90 parts glycerol by weight to 100 parts phthalic anhydride usually are required. Any possible reduction in proportion of glycerol without sacrifice in quality of product would be advantageous from the standpoint of cost of starting materials and would be of particular value under present war conditions due to prevailing shortages of glycerol.

The present invention is directed to and provides modified alkyd resins of desired quality, prepared in a relatively inexpensive manner both as to cost of materials and time consumed in carrying out the reaction, which contain a modifying agent serving not only as a modifier but also as a substitute in part for the polyhydric alcohol used in preparing the composition. The invention thus makes possible the production of satisfactory resins having comparatively low glycerol content. For instance, by way of illustration only, novel resins prepared according to the invention may contain 25 parts glycerol to 100 parts phthalic anhydride, a much lower than usual proportion.

In accordance with the present invention, modification of the alkyd resin is accomplished by the use of certain acids derived by partial oxidation of lubricating oil fractions having an average of at least one naphthenic ring per molecule. When a lubricating oil having the aforesaid proportion of naphthenic constituents, for instance a technical white oil substantially free of aromatic hydrocarbons, is oxidized until it has a saponification number of about 100 to 200 by blowing air therethrough at a temperature of 100° to 160° C. and under a pressure from atmospheric to 150 pounds per square inch either in the presence of or without a catalyst, there is formed, in addition to relatively simple carboxylic acids, a substantial amount of relatively highly oxidized acids which contain in addition to the carboxyl group at least one hydroxyl group and generally more than one carbonyl group per molecule. The amount of such highly oxidized acids resulting from partial oxidation in this manner may vary considerably depending on the conditions and catalyst used in the oxidation and the degree of oxidation effected, the higher the saponification number of the crude oxidation product the greater being the amount obtained. When only a mild oxidation is effected, substantially none of these highly oxidized acids are formed, whereas with more severe oxidation the highly oxidized acids may amount to fifty per cent or more of the crude oxidation product. These relatively highly oxidized acids are insoluble in the low molecular weight hydrocarbons having from 3 to 7 carbon atoms per molecule, for instance pentane, and, accordingly, may be separately recovered from the crude oxidation product by mixing the latter with pentane or other such low boiling hydrocarbon and then decanting the pentane solution from the pentane-insoluble material. A portion of at least one part of pentane to one part of crude oxidation product should be used, and 2–4 parts for each part of crude product is preferred. However larger proportions may be used if desired. A relatively highly oxidized, pentane-insoluble acidic material is obtained in this manner.

This pentane-insoluble oxidation product is the material employed in preparing the novel, modified alkyd resins of the present invention. It is a viscous, dark reddish material usually having a molecular weight of roughly 400 and an acid number of 100–130, and in comparison with the pentane-soluble acids contains a relatively high proportion of oxygen within the molecule. Due to the molecular complexity its exact chemical structure has not been positively identified, but it comprises both cyclopentane and cyclohexane rings and contains at least one carboxyl group and at least one hydroxyl group and more than one carbonyl group per molecule. As aforementioned, the pentane-insoluble material performs the dual role of modifier and partial substitute for the polyhydric alcohol, and its ability to serve as a substitute is presumed to be due to the presence of the hydroxyl groups.

The present invention will be best understood by considering the specific formation of an alkyd resin in accordance therewith. By way of illustration, 100 parts by weight of phthalic anhydride are mixed with 24 parts by weight of glycerol and 109 parts by weight of the above mentioned pentane-insoluble acids obtained by partial oxidation of a lubricating oil containing the specified proportion of naphthene rings, and the mixture is heated to a temperature of about 225° C. preferably in an inert atmosphere, for instance an atmosphere of carbon dioxide or nitrogen, for a period of time sufficient to produce a resin having a desired degree of hardness. The length of the heating period controls the degree of hardness of the product for any given composition and may be varied in accordance with the type of product desired. Also the temperature affects the rate of reaction and consequently the character of product obtained for a given time of heating. As a general rule, heating the mixture to a temperature of about 225° C. for about one hour produces a satisfactory resin which is soluble in all the usual varnish solvents. Heating for too long a period of time produces a hard, brittle, substantially insoluble resin. Preferably, the reaction is stopped before this stage is reached and while the resin is still soluble in varnish solvents. Normally the reaction is stopped before a gel is formed, such gel formation being a warning that the reaction has gone too far and that the cool product may be relatively insoluble. Considerable variations of temperature and time of reaction are possible and control thereof determines to a substantial extent the properties of the product, and it is to be noted that insoluble type resins as well as the soluble type may be prepared if desired.

It is also possible to vary the proportions of constituents to a large degree, for example widely different proportions of the pentane-insoluble oxidation product may be employed. Generally four parts of a polybasic acid, one-two parts of a polyhydric alcohol and one-four parts of a pentane-insoluble acidic material will be employed. Thus, if desired, the pentane-insoluble material may be used in such proportion as to function principally as a modifier, in which case a mixture of about two parts phthalic anhydride, one part glycerol and about one part of the pentane-insoluble material might be used. However, since the pentane-insoluble oxidation product is relatively inexpensive and since it is capable of replacing a substantial amount of glycerol in the alkyd resin, it is generally desirable to use the pentane-insoluble material in amount such that it will serve not only as a modifying agent but also as a substitute for a considerable part of the glycerol. A typical formula for an alkyd resin in which a part of the glycerol is replaced by the pentane-insoluble material would be about four parts of phthalic anhydride, four parts of pentane-insoluble oxidation product and one part of glycerol.

The use of the pentane-insoluble oxidation acids is applicable to the modification of other alkyd resins such as those produced by the reaction of glycol, mannitol or sorbitol with phthalic anhydride or by the reaction of these polyhydric alcohols or glycerol, either individually or in admixture with each other, with one or more polybasic acids such as succinic, maleic, tartaric or citric acids, or anhydrides thereof, used individually, in admixture with each other or in admixture with phthalic anhydride. Since the pentane-insoluble oxidation acids specified above are relatively inexpensive, the cost of suitably modified products for incorporation in coating or other compositions is substantially reduced, and due to present war-time shortage of glycerol the supply of such coatings may be substantially increased by replacing a large part of the glycerol in such coatings with the pentane-insoluble oxidation acids. In all cases it is found that these acids take part in the chemical reaction and are not merely present in physical admixture with the alkyd resinous material produced by the reaction of the polyhydric alcohol and polybasic acid.

It is to be noted that alkyd resins also may be prepared in accordance with the present invention by first reacting a polybasic acid with a polyhydric alcohol for a period of time sufficient to form only relatively simple esters of the reactants, then adding the pentane-insoluble oxidation acids and further reacting for sufficient length of time to obtain the desired product quality.

In the following claims where reference is made to a polybasic acid it will be understood that the anhydride thereof is included since in various cases the anhydride is the form commercially available or most desirably used.

We claim:

1. An alkyd resin comprising the reaction products formed upon heating of four parts of a polycarboxylic acid, one-two parts of a polyhydric alcohol and one-four parts of a pentane-insoluble acidic material containing an hydroxyl group, a carboxyl group and a plurality of carbonyl groups in the molecule, said material having been formed by oxidizing a lubricating oil, containing an average of a naphthene ring per molecule, by means of a free-oxygen containing gas at a temperature of about 100° C.–160° C. and at a pressure of about atmospheric to 150 pounds per square inch until said oil has a saponification number of about 100 to 200 and recovering said material from said oxidized oil.

2. An alkyd resin according to claim 1 wherein the polycarboxylic acid is phthalic anhydride and the polyhydric alcohol is glycerol.

3. The method of making an alkyd resin which comprises heating, for a time sufficient to produce a resin having desired hardness and solubility characteristics, a mixture comprising four parts of a polycarboxylic acid, one-two parts of a polyhydric alcohol and one-four parts of a pentane-insoluble acidic material containing an hydroxyl group, a carboxyl group and a plurality of carbonyl groups in the molecule, said material having been formed by oxidizing a lubricating oil, containing an average of a naphthene ring per molecule, by means of a free-oxygen containing gas at a temperature of about 100° C.–160° C. and at a pressure of about atmospheric to 150 pounds per square inch until said oil has a saponification number of about 100 to 200 and recovering said material from said oxidized oil.

4. The method of claim 3 wherein the polycarboxylic acid is phthalic anhydride and the polyhydric alcohol is glycerol.

5. The method of making an alkyd resin which comprises heating a mixture comprising four parts of a polycarboxylic acid and one-two parts of a polyhydric alcohol for a time sufficient to form only relatively simple esters of the reactants and then admixing these with one-four parts of a pentane-insoluble acidic material containing an hydroxyl group, a carboxyl group and a plurality of carbonyl groups in the molecule, said material having been formed by oxidizing a lubricating oil, containing an average of a naphthene ring per molecule, by means of a free-oxygen containing gas at a temperature of about 100° C.–160° C. and at a pressure of about atmospheric to 150 pounds per square inch until said oil had a saponification number of about 100 to 200 and recovering said material from said oxidized oil and continuing the reaction for a time sufficient to produce a resin having desired hardness and solubility characteristics.

6. The method of claim 5 wherein the polycarboxylic acid is phthalic anhydride and the polyhydric alcohol is glycerol.

JOHN HAROLD PERRINE.
HERBERT L. JOHNSON.